United States Patent
De Gaetano et al.

(10) Patent No.: US 11,055,420 B2
(45) Date of Patent: Jul. 6, 2021

(54) CONTROLLING ACCESS TO DATA REQUESTED FROM AN ELECTRONIC INFORMATION SYSTEM

(71) Applicant: International Business Machines Corporation, Armonk, NY (US)

(72) Inventors: Rossella De Gaetano, Rome (IT); Paolo Ottaviano, Rome (IT); Gianluca Perreca, Rome (IT); Antonio Bagarolo, Marcianise (IT)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 15/888,278

(22) Filed: Feb. 5, 2018

(65) Prior Publication Data

US 2019/0243979 A1 Aug. 8, 2019

(51) Int. Cl.
| | | |
|---|---|---|
| G06F 21/31 | (2013.01) | |
| G06F 21/60 | (2013.01) | |
| G06F 9/54 | (2006.01) | |
| G06F 21/62 | (2013.01) | |
| G06N 20/00 | (2019.01) | |

(52) U.S. Cl.
CPC ............ *G06F 21/604* (2013.01); *G06F 9/547* (2013.01); *G06F 21/31* (2013.01); *G06F 21/6218* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,341,405 B2 | 12/2012 | Meijer et al. | |
| 8,793,761 B2 | 7/2014 | Chow et al. | |
| 8,914,411 B1 | 12/2014 | Mumford et al. | |
| 9,438,604 B1* | 9/2016 | Addala | ............... H04L 63/105 |
| 9,565,305 B2 | 2/2017 | Chakravarthy et al. | |
| 2008/0028453 A1* | 1/2008 | Nguyen | ............... G06F 21/335 |
| | | | 726/9 |
| 2015/0363481 A1 | 12/2015 | Haynes | |
| 2016/0112391 A1* | 4/2016 | Jamrog | ............ G06F 16/24575 |
| | | | 726/4 |
| 2016/0379120 A1* | 12/2016 | Merdivan | ........... G06F 16/3329 |
| | | | 706/46 |
| 2017/0039275 A1* | 2/2017 | Akolkar | ............... G06F 16/345 |

(Continued)

OTHER PUBLICATIONS

"Technique for personalized question answering by orchestrating different system using corpus relevancy", An IP.com Prior Art Database Technical Disclosure, Disclosed Anonymously, IP.com No. IPCOM000239698D, Electronic Publication Date: Nov. 26, 2014, 4 pages.

*Primary Examiner* — Fatoumata Traore
(74) *Attorney, Agent, or Firm* — Jamar K. Ray (57) ABSTRACT

An access control method for controlling access to data requested from an electronic information system. The method comprises receiving a request for the data, determining a user identity associated with the request; gathering the requested data from one or more data sources by an orchestrator for input to a cognitive engine; analyzing the requested data; based on results of analyzing the requested data, deciding on whether the user identity can be allowed to access the requested data; providing feedback by the user identity; and updating a learning module based on the feedback.

20 Claims, 3 Drawing Sheets

(56) References Cited

U.S. PATENT DOCUMENTS

| | | | |
|---|---|---|---|
| 2017/0091662 A1* | 3/2017 | Sanchez | G06F 16/2465 |
| 2018/0007053 A1* | 1/2018 | Grant | H04L 63/101 |
| 2018/0176269 A1* | 6/2018 | Griffin | H04L 65/403 |
| 2019/0034487 A1* | 1/2019 | Balachandran | G06F 16/24549 |

* cited by examiner

CONTROLLING ACCESS TO DATA REQUESTED FROM AN ELECTRONIC INFORMATION SYSTEM

BACKGROUND

The present disclosure relates to data processing systems, and, more specifically, to controlling access to data requested from an electronic information system.

Companies may use both tools on premise and tools on the internet/cloud to run their continuous delivery process. For example, the code (e.g., for an application, a tool, etc.) could be on a web-based development platform like GitHub. The customer relationship management (CRM) system could be on premise together with the tools for project management. The build tools could be on premise and the test tools could be somewhere on the web (e.g. Travis Continuous Integration (CI)).

Approval for deployments may be required in tools that for historical reasons/networking reasons are not integrated with the actual deployment tools. Furthermore, project management tools and code management tools may be isolated from each other.

Obtaining statistics across multiple applications (e.g. how many deployments are successful; for the failing ones, how many are related to real code changes vs infrastructure problems?) as well as enforcing processes can be challenging. For example, deployments may be started without approval.

Knowledge of the systems can be spread across departments and data correlation and problem determination may require human intervention because of access restrictions and/or expertise requirements.

In addition, there remains the need to ensure only authorized people get access to specific information and tools.

SUMMARY

Aspects of the present disclosure are directed toward an access control method for controlling access to data requested from an electronic information system. The method comprises receiving a request for the data, determining a user identity associated with the request, gathering the requested data from one or more data sources by an orchestrator for input to a cognitive engine, and analyzing the requested data. The method can further comprise, based on results of analyzing the requested data, determining whether the user identity is allowed to access the requested data. The method can further comprise providing feedback by the user identity and updating a learning module based on the feedback.

Further aspects of the present disclosure are directed toward a computer program product for controlling access to data requested from an electronic information system. The computer program product comprises a computer readable storage medium having program instructions embodied therewith. The program instructions can be executable by a computer system to cause the computer system to perform a method comprising receiving a request for the data, determining a user identity associated with the request, gathering the requested data from one or more data sources by an orchestrator for input to a cognitive engine, and analyzing the requested data. The method can further comprise, based on results of analyzing the requested data, determining whether the user identity is allowed to access the requested data. The method can further comprise providing feedback by the user identity and updating a learning module based on the feedback.

Further aspects of the present disclosure are directed toward a system for controlling access to data requested from an electronic information system. The system comprises at least a bot configured for receiving a request for the data, a cognitive engine configured for determining a user identity associated with the request and analyzing the requested data, an orchestrator configured for gathering the requested data from one or more data sources for input to the cognitive engine, an API layer configured for calling service functions, services configured for routing functions and data, and a learning module for being updated based on feedback by the user identity.

BRIEF DESCRIPTION OF THE SEVERAL VIEWS OF THE DRAWINGS

The present disclosure together with the above-mentioned and other objects and advantages may best be understood from the following detailed description of the embodiments, but not restricted to the following embodiments.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

In the drawings, like elements are referred to with equal reference numerals. The drawings are merely schematic representations, not intended to portray specific parameters of the disclosure. Moreover, the drawings are intended to depict only typical embodiments of the disclosure and therefore should not be considered as limiting the scope of the disclosure.

The illustrative embodiments described herein provide a method for controlling access to data requested from an electronic information system. The illustrative embodiments may be used for the method for (i) receiving a request for the data; (ii) determining a user identity associated with the request; (iii) gathering the requested data from one or more data sources by an orchestrator for input to a cognitive engine; (iv) analyzing the requested data; (v) based on results of analyzing the requested data, deciding on whether the user identity can be allowed to access the requested data; (vi) providing feedback by the user identity; and (vii) updating a learning module based on the feedback.

Aspects of the present disclosure can use cognitive technologies to build an automatic responder (e.g., an application executing on a computer and interacting with a user via a display) that not only interacts with users by proposing possible solutions to known problems (e.g., providing answers to questions, providing contact information for relevant subject matter experts, etc.), but can also suggest possible recovery actions (e.g., providing instructions on how to upgrade a permission level, recover a password, etc.). According to some embodiments, the automatic responder can identify people with needed expertise, can deny answers based on security policies, and can notify appropriate people/tools in case of attempted policy violations.

For example, a user identity may no longer be able to access a service. The root cause may be identified as a password change. A bot, upon problem description (e.g., receiving a request from the user identity), can analyze the logs of the service and can access several tools and identify possible causes. If the user identity is not entitled to reset the password (which may be checked by the bot as well) the user identity can be notified (e.g., by providing a set of instructions for the password reset or by providing instructions on how to submit a request to get a needed access level). In some embodiments, if the user identity attempts a password change, security services may be notified.

Figure 1:
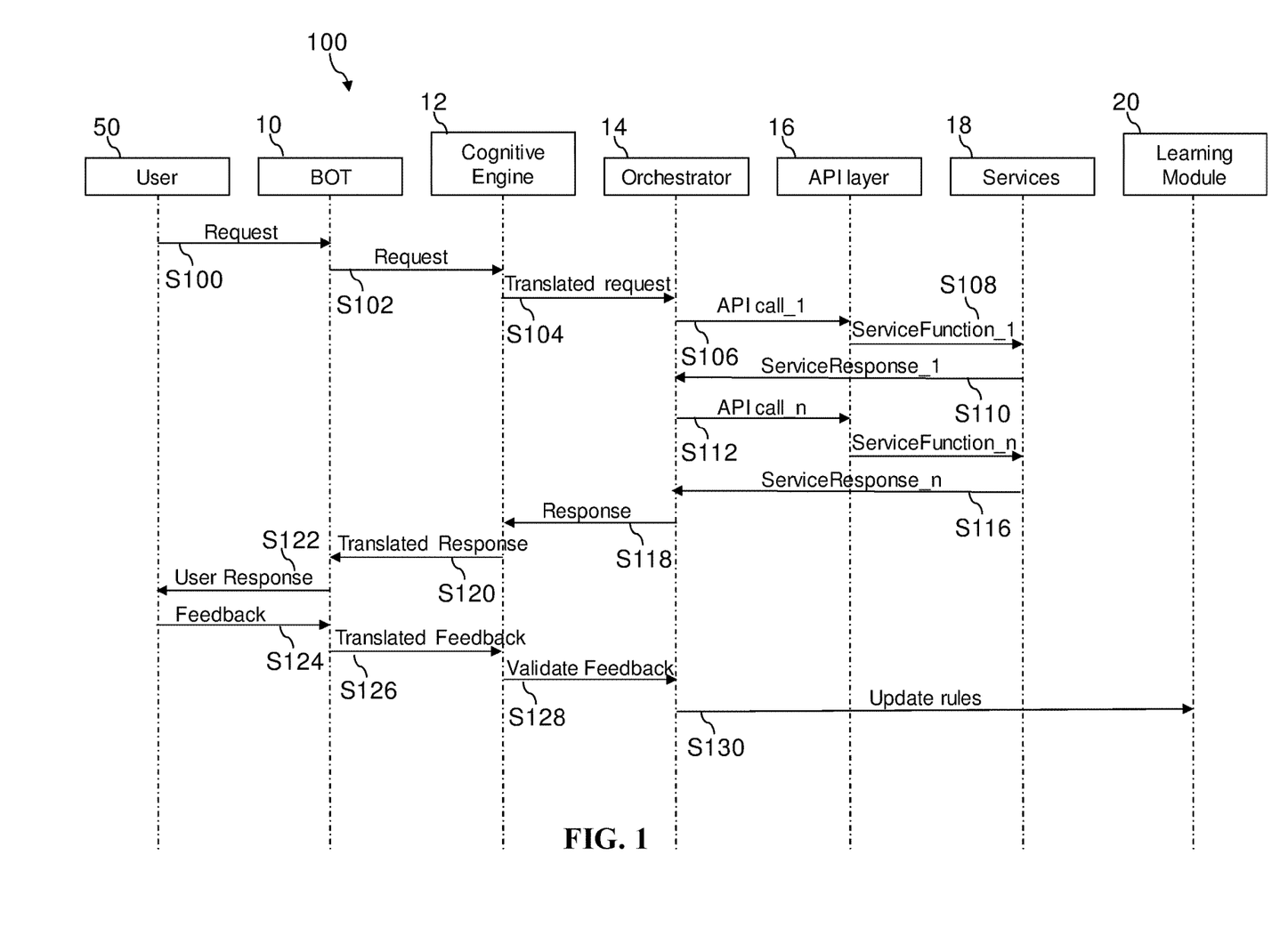
FIG. 1 depicts an example control sequence chart for a system for controlling access to data requested from an electronic information system according to some embodiments of the disclosure.

FIG. 1 depicts an example control sequence chart for a system 100 for controlling access to data requested from an electronic information system according to some embodiments of the disclosure.

The system 100 comprises (i) a bot 10 configured for receiving a request for the data; (ii) a cognitive engine 12 configured for determining a user identity 50 associated with the request and/or analyzing the requested data; (iii) an orchestrator 14 configured for gathering the requested data from one or more data sources for input to the cognitive engine 12; (iv) an application programming interface (API) layer 16 configured for calling service functions; (v) services 18 configured for routing functions and/or data; and (vi) a learning module 20 for being updated based on feedback by the user identity 50.

The bot 10 interfaces with the user identity 50 using natural language (e.g., text or speech). The user identity 50 sends a request for data, S100, to the bot 10. The bot 10 includes an authentication system capable of recognizing the user identity 50 associated with the request. The user identity 50 may be required to use credentials to get access to the bot 10 (e.g., a username and password, a personal identification number (PIN), etc.). The bot 10 forwards the request to the cognitive engine 12 in operation S102.

The cognitive engine 12 translates the request and forwards it to the orchestrator 14 in operation S104. The cognitive engine 12 can be configured to understand human language and may use a corpus of structured and unstructured data obtainable using the API layer 16. In some embodiments, the cognitive engine 12 can classify the request.

A classification of the request can indicate whether the requested information is available from public sources, or if the requested information should be retrieved from one or more tools (e.g., using orchestrator 14), or if the requested information requires additional corpora.

The orchestrator 14 can decide on tools to be used based on information from the classifier and/or information on processes the bot 10 can report on and/or take action on.

The orchestrator 14 can be configured to recognize, based on the input of the bot 10, which tool and/or data sources to interact with. The orchestrator 14 can combine the output in situations where different tools and/or data sources are queried. The orchestrator 14 sends API calls to the services 18 (via API layer 16), shown in operations S106 and S112.

In some embodiments, the orchestrator 14 can be further configured to use querying tools for determining permissions associated with the user identity 50.

An API layer 16 can be provided as a bridge for forwarding the request to an external service 18 by service functions. In some embodiments, the cognitive engine 12 and/or the orchestrator 14 can transmit data obtained using the API layer 16.

The API layer 16 (also referred to as a bridge layer, in some embodiments) can be in charge of connecting across firewalls, VPNs, and/or any other functions connecting applications spread across cloud providers and on premise data centers.

The services 18 can be configured to receive service functions from the API layer 16, as shown in operations S108 and S114. Furthermore, the services 18 can be configured to deliver service responses, as shown in operations S110 and S116 directly to the orchestrator 14.

A security controller (not shown) can be configured to federate different data sources and unstructured data. The security controller can be configured to determine whether the user identity 50 consulting the bot 10 is entitled to access the required information and/or is entitled to perform the requested action (e.g., based on security permissions). For example, the user identity 50 may have sufficient permissions to access a wiki page, open a ticket, see passwords, look at reports, or the like. In contrast, the user identity 50 may not have sufficient permissions to see salaries, addresses, social security numbers, or other information.

The orchestrator 14 forwards the response to the cognitive engine 12, operation S118, from where the translated response can be forwarded to the bot 10 in operation S120. The bot 10 can inform the user identity 50 about the response in operation S122.

The user identity 50 sends feedback to the bot 10 in operation S124. A translated feedback can be forwarded to the cognitive engine 12 in operation S126. The cognitive engine 12 forwards a validated feedback in operation S128 to the orchestrator 14. The orchestrator 14 can be configured to send information to the learning module 20 in order to update rules in operation S130. The learning module 20, relying on cognitive computing, can thus learn and tune subsequent user interaction based on user feedback and interactions.

The bot 10 may also be interfaced by another system (e.g., rather than by human beings).

FIG. 1 is intended to represent the major components/operations of an example control sequence for controlling access to data according to embodiments of the present disclosure. In some embodiments, however, individual components/operations can have greater or lesser complexity than shown in FIG. 1, and components/operations other than, or in addition to those shown in FIG. 1 can be present. Furthermore, in some embodiments, various components/operations illustrated in FIG. 1 can have greater, lesser, or different functionality than shown in FIG. 1.

Figure 2:
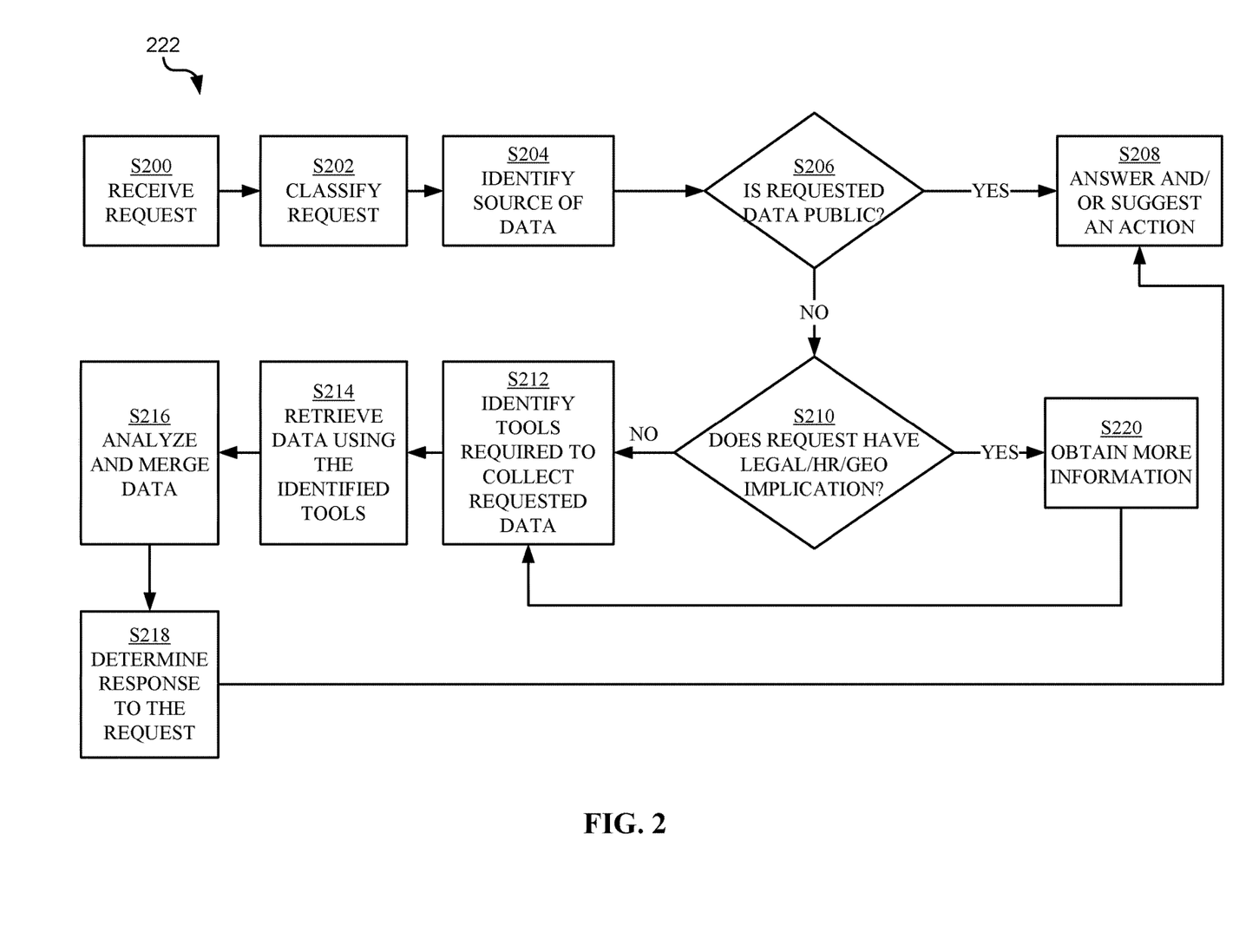
FIG. 2 depicts a flowchart of an example method for controlling access to data requested from an electronic information system according to some embodiments of the disclosure.

FIG. 2 depicts a flowchart of an example method 222 for controlling access to data requested from an electronic information system according to some embodiments of the disclosure. In various embodiments, the method 222 can be implemented by one or more processors. In some embodiments, the method 222 can be implemented by, for example, the system 100 of FIG. 1.

After being authenticated, a user identity (e.g., user identity 50 of FIG. 1) sends, in natural language (e.g., text or speech), a request to a bot (e.g., bot 10 of FIG. 1). The request can be a simple question or a request to perform an action. The request can be received and interpreted by the bot in operation S200.

A scope of the requested data may be determined and, based on the scope, it can be determined whether the user identity is allowed to access the requested data. The scope may include information on whether the requested data is public.

In operation S202 the request can be classified according to the entity and intents defined in the cognitive engine (e.g., cognitive engine 12 of FIG. 1). For example, an entity can refer to user identity information (e.g., role, permissions, location, historical information, etc.), a type of data requested, a location of the requested data (e.g., a location the data is stored in, or data relevant to a particular location), and so on. Intents can refer to, for example, viewing data, modifying data, transmitting data, executing an action, installing a program, and so on.

According to the classification, the necessary source of data can be determined in operation S204, particularly, if requested data can be retrieved from public sources (e.g., Wikipedia, the general cognitive corpus). For other sources, it may be necessary to call an orchestrator (e.g., orchestrator 14 of FIG. 1) to retrieve data using several tools. It may also be necessary to retrieve additional cognitive corpora (e.g. legal), human resources (HR) corpora and databases, and/or geographical data based on the requested data. Geographical data can be, for example, data regarding special regulations, such as European Union (EU) regulations (e.g., regulations requiring that data must be stored in a specific location).

In operation S206 it is determined if the request may be satisfied by public information. If the request may be satisfied by public information, an answer can be generated in operation S208 and returned to the user identity.

In operation S210, it is determined if the request requires additional data (legal, HR, geographical, or other data).

If this is not the case, then in operation S212 the orchestrator (e.g., orchestrator 14 of FIG. 1) can be called. The orchestrator can be in charge of calling all the tools needed to obtain the needed data. A tool in this sense may be another software, a hardware device, a database, a WIKI, a forum, or another source of information.

If, in operation S210, it is decided that additional data are needed, the additional data can be gathered in operation S220 and forwarded to the orchestrator in operation S212. For this purpose, additional data sources can be queried. Additional data sources can be, for example, other cognitive corpora (e.g. legal), geographical information about the user identity, a HR position of the user identity, or information regarding confidential data.

The additional information can be sent to the orchestrator so that the set of tools that may be queried can be reduced (e.g., limited, simplified, etc.), or so that the types of queries used in the tools can include specific parameters (e.g. get data only for a certain geographic region) in order to limit the retrieved data.

Gathering data from one or more data sources can comprise the orchestrator forwarding the request to the one or more data sources, collecting responses to the request generated by the data sources, and/or merging the responses to a merged set of requested data.

In some embodiments, the orchestrator receives information regarding which tools and/or data sources to interact with from the bot.

The orchestrator calls the various tools in order to get the requested data in operation S214. Which tools to call is based on classification information and/or from structured information that defines the processes the bot is configured to report about or take action on.

Analysis coming from operation S220 may also condition the selection of tools (e.g. for privacy reasons only data from a specific set of countries may be analyzed).

The obtained data retrieved from the various tools and from the additional sources can be then analyzed in operation S216 and combined to obtain the answer. For example, operation S216 can include providing logs analysis and/or status reports.

The result of the analysis can be sent, together with legal restrictions and the list of roles the user identity has on the various traversed tools, to the component responsible to generate an appropriate response in operation S218 regarding what answer to send back to the user identity. If there are legal restrictions on the information or restrictions coming from other sources not managed by the orchestrator, the answer may be, for example, "you are not authorized to get this data", or "you need to follow this additional procedure to get access to this data". If there are no legal obstacles and the user identity can be entitled to access all the traversed tools, the answer can be returned to the user identity in operation S208. If there are no legal obstacles, but the user identity does not have access to some of the tools traversed, yet the cognitive software suggests to grant access to the information because it is not a security exposure, the information can be returned to the user identity. For example, a user identity may not have permissions sufficient to view requested data, however, the cognitive software may determine that at least a portion of the requested data is not sensitive and is appropriate to be viewed by the user identity. Based on the determination by the cognitive software, the at least a portion of the requested data can be provided to the user identity. In some embodiments, the at least a portion of the requested data can be provided to the user identity together with a notification that the user identity is not associated with appropriate permissions for accessing all the requested data and instructions on how to request appropriate authorization to access all the requested data.

Feedback may be provided by the user identity for updating a learning module (e.g., learning module 20 of FIG. 1) based on the feedback. The learning module can be configured to learn user interaction based on user feedback and interaction via cognitive computing.

Advantageously, in some embodiments, the present disclosure does not rely on the sum of the atomic permissions on a set of tools. For example, to get a specified information it may be necessary to traverse a first tool, a second tool and a third tool. In this example, the user identity may be entitled to access the first tool and the third tool, but not the second tool. The second tool may not have granular permissions (e.g., the second tool may be limited to either see all data or no data). The user identity may be interested in a small subset of the data. In some embodiments of the present disclosure, an abstraction layer must be built across all three tools with another set of permissions and roles that would add the additional granularity needed (e.g., providing granular access to the small subset of the data associated with the second tool). In other embodiments of the present disclosure, the detection on whether or not a piece of information should be visible to the user identity may not be coded in any specific layer, but instead may depend on how the cognitive classifiers have been defined and thus can be based on the interaction across multiple cognitive corpora and traditional data sources. Thus, the cognitive engine can be trained and can evolve with the time invested only on the classifier, while the rules in the orchestrator to call the various tools may stay the same as far as the tools to be called remains the same. The final decision may be partially dependent on the direct permissions the user identity has on the various tools and data sources. Furthermore, the final decision may be partially dependent on insights generated by the cognitive engine and/or the learning module.

Further advantages of the present disclosure can be that classifiers, intents, and entities are the cornerstone of cognitive applications. They may be defined by a person skilled on the topics which the bot is configured to answer to. This person does not necessarily need programming skills. Thus, aspects of the present disclosure provide improved usability at least insofar as aspects of the disclosure implement dynamic cognitive learning to augment static cybersecurity permissions.

The orchestrator in the simplest embodiment does not need cognitive capabilities since, based on the classifier, intent and entity understood by the bot, it can call a well-defined chain of tools. For example, there may exist a list of predefined workflows that can be triggered per each combination (classifier, intent, entity).

Since the orchestrator has all information on how to reach out the various tools it is also able to query the various tools to understand which permissions the user is associated with. For performance reasons, data may be cached.

Figure 3:
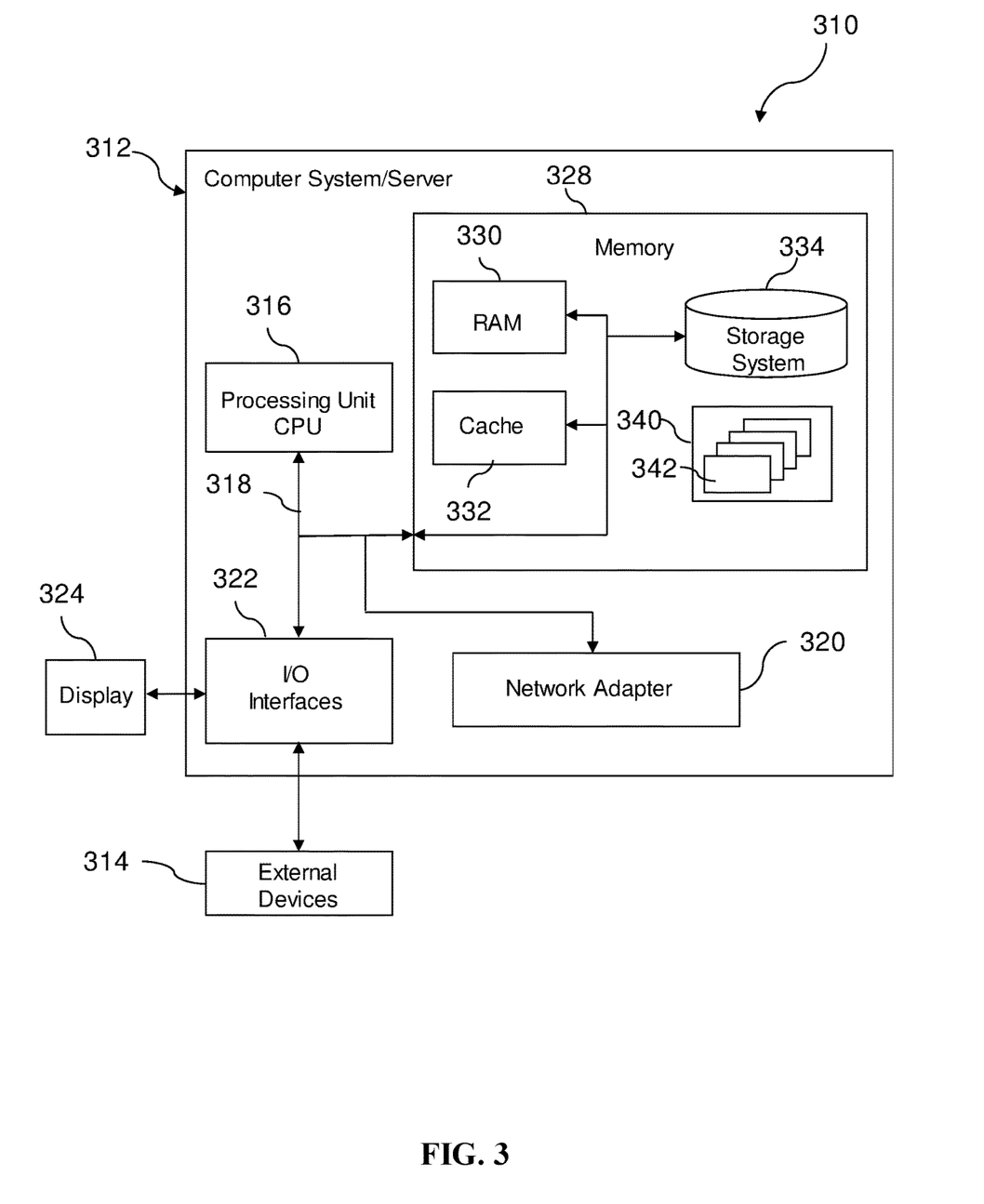
FIG. 3 depicts an example data processing system for executing a method according to some embodiments of the disclosure.

Referring now to FIG. 3, a schematic example of a data processing system 310 is shown. Data processing system 310 is only one example of a suitable data processing system and is not intended to suggest any limitation as to the scope of use or functionality of embodiments of the disclosure described herein. Regardless, data processing system 310 can be capable of being implemented and/or performing any of the functionality set forth herein above.

In data processing system 310 there can be a computer system/server 312, which can be operational with numerous other general-purpose or special-purpose computing system environments or configurations. Examples of well-known computing systems, environments, and/or configurations that may be suitable for use with computer system/server 312 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in data processing system 310 can be shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that can be accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the disclosure as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

For clarity, several example embodiments of the present disclosure are now provided. In a first example, a user executes an application (e.g., an automatic responder), as part of executing the application, provides credentials to the application (e.g., a username, a password, biometric information such as a spoken phrase, facial recognition, fingerprint recognition, and so on). The user can then provide a request for data to the application (e.g., via a textual question, phrase, or word(s) input to the application, or via a question spoken to the application). The application receives the request for data and collects information regarding the user identity associated with the credentials provided to the application (e.g., a role of the user, permission levels of the user, a security clearance of the user, a location of the user, and/or historical information about the user such as previous queries, previous information requests, program projects the user is associated with, and so on). The application can use an orchestrator to gather the requested data from a plurality of data sources and input the requested data into a cognitive engine. The plurality of data sources can include internet data sources (e.g., websites), internal data sources (e.g., databases), public data, private data, confidential data, and/or other types of data. The cognitive engine can analyze the collected data, the user identity information, and the request input to the application. The cognitive engine can generate an appropriate response and provide the response to the user via the application interface.

In situations where the user does not have permission to access the data, the application may indicate the user cannot access the data and also provide, together with the notification, instructions for how to request access to the data. The instructions may include, for example, instructions on how to locate, prepare, and submit a request for increased permission levels. The instructions may also include, for example, contact information for one or more people who are authorized to access that data and may provide suitable answers to the user question without necessarily allowing the user full access to the restricted data. In some embodiments, the cognitive engine may determine that, although the user does not have the necessary authorization to access the requested data, the nature of the answer may be appropriate to provide to the user.

For example, a user can submit a question such as, "how many employees are there in country y". To determine the answer may require the cognitive engine to query databases including confidential employee information that the user does not have access to. However, the cognitive engine may determine that an approximate answer, without any detailed information, does not constitute a security danger and may therefore provide an answer such as "between 1,000 and 1,200" without providing the user direct access to any of the sensitive information.

In another example, a user can request access to a software development tool or project management tool. The user may not have sufficient permissions to download the tool, but the cognitive engine may determine all individuals associated with a same project as the user have access to the requested tool. In response, the cognitive engine may provide the requested tool to the user, provide a trial of the requested tool the user, and/or provide instructions detailing how the user may request modified permission levels in order to have access to the requested tool.

In some embodiments, the user provides feedback to the cognitive engine. Feedback can comprise, but is not limited to, a thumbs up or thumbs down, a number of stars, an emoji or emoticon, a number rating, a percent rating, and/or textual feedback. The application can use the feedback to automatically and continuously improve the application.

Thus, aspects of the present disclosure provide an improvement in computer technology at least insofar as aspects of the present disclosure enable cognitive computing to be applied to permission levels and security rules associated with sensitive information. These security rules have traditionally relied exclusively on static rules (e.g., roles). Exceptions and/or modifications to such static rules have traditionally required time-consuming administrative approval based on human judgement. Advantageously, aspects of the present disclosure provide appropriately granular access to sensitive information using an application interface (e.g., a bot), a cognitive engine, an orchestrator, an API layer, services functionality, and a learning module.

Aspects of the present disclosure (e.g., the cognitive engine 12 of FIG. 1, the orchestrator 14 of FIG. 1, and/or the learning module 20 of FIG. 1) can utilize machine learning such as, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, aspects of the present disclosure can be configured to perform machine learning using one or more of the following example techniques: K-nearest neighbor (KNN), learning vector quantization (LUQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present disclosure may also be delivered as part of a service engagement with a client corporation, non-profit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

Any advantages discussed in the disclosure are example advantages, and embodiments exist that can contain all, none, or some of the advantages discussed while remaining within the spirit and scope of the present disclosure.

What is claimed is:

1. An access control method for controlling access to data requested from an electronic information system, the method comprising:
   receiving, from a user identity, credentials and a request for the data;
   collecting user identity information associated with the credentials;
   classifying, by a cognitive engine, the request, resulting in a classification of the request,
      wherein the cognitive engine classifies the request according to the user identity information and at least one defined intent;
   determining, based on the request, to retrieve additional data, the additional data selected from the group consisting of human resources data, data regarding legal restrictions, and regulatory data;
   retrieving the additional data;
   gathering, based on the classification, the requested data from one or more data sources by an orchestrator for input to the cognitive engine;
   analyzing the requested data and the additional data;
   based on results of the analyzing, determining whether the user identity is allowed to access the requested data;
   obtaining feedback from the user identity; and
   updating a learning module based on the feedback.

2. The method according to claim 1, wherein the method further comprises determining a scope of the requested data, and wherein deciding whether the user identity is allowed to access the requested data is based on the scope of the requested data.

3. The method according to claim 2, wherein the scope of the requested data includes information on whether the requested data is public data.

4. The method according to claim 1, wherein gathering the requested data from one or more data sources comprises performing, by the orchestrator, a method comprising:
   forwarding the request to the one or more data sources;
   collecting responses to the request, wherein the responses are generated by the data sources; and
   merging the responses to a merged set of requested data.

5. The method according to claim 1, further comprising interacting with the user in natural language using a bot comprising an authentication system.

6. The method according to claim 5, further comprising receiving, at the orchestrator and from the bot, information identifying which tools and data sources to use.

7. The method according to claim 1, further comprising forwarding the request to an external service using an application programming interface (API) layer as a bridge.

8. The method according to claim 7, further comprising transmitting, by the cognitive engine, data obtained using the API layer.

9. The method according to claim 8, wherein the cognitive engine is configured to perform natural language processing.

10. The method according to claim 1, wherein determining whether the user identity is allowed to access the requested data is based, at least in part, on a security controller configured to federate different data sources and unstructured data.

11. The method according to claim 1, further comprising learning, using a learning module configured for cognitive computing, user interaction based on user feedback.

12. The method according to claim 1, wherein gathering the requested data further comprises:
    identifying information from public sources; and
    calling the orchestrator to retrieve data using multiple tools.

13. The method according to claim 1, wherein the orchestrator is configured to identify at least one tool to be used based on information from a classifier and information received from a bot interfacing with the user identity.

14. The method according to claim 1, wherein the orchestrator is configured to use querying tools for determining permissions associated with the user identity.

15. The method according to claim 1, further comprising:
    determining the user identity is not allowed to access the requested data;
    providing a notification to the user identity indicating the user identity is not allowed to access the requested data; and
    providing, with the notification, instructions for requesting appropriate authorization for accessing the requested data.

16. The method according to claim 15, further comprising:
    providing, with the notification, and in response to determining the user identity is not allowed to access the requested data, at least a portion of the requested data in response to determining, using cognitive computing, the at least a portion of the requested data is secure for viewing by the user identity.

17. The method according to claim 1, wherein the user identity information is selected from the group consisting of a permission level of the user identity, a role of the user identity, a security clearance of the user identity, and a location of the user identity.

18. The method according to claim 1, wherein the defined intent is selected from the group consisting of viewing data, modifying data, transmitting data, and installing a program.

19. A computer program product for controlling access to data requested from an electronic information system, the computer program product comprising a computer readable storage medium having program instructions embodied therewith, the program instructions executable by a computer system to cause the computer system to perform a method comprising:
    receiving, from a user identity, credentials and a request for the data;
    collecting user identity information associated with the credentials;

classifying the request according to the user identity information and at least one defined intent, the classifying resulting in a classification of the request;
determining, based on the request, to retrieve additional data, the additional data selected from the group consisting of human resources data, data regarding legal restrictions, and regulatory data;
retrieving the additional data;
gathering, based on the classification, the requested data from one or more data sources by an orchestrator for input to a cognitive engine;
analyzing the requested data and the additional data;
based on results of the analyzing, determining whether the user identity is allowed to access the requested data;
obtaining feedback from the user identity; and
updating a learning module based on the feedback.

20. A system for controlling access to data requested from an electronic information system, the system comprising at least:
  a bot configured for receiving, from a user identity, credentials and a request for the data, the bot further configured for forwarding the request to a cognitive engine;
  the cognitive engine configured for determining the user identity associated with the request, analyzing the requested data, and classifying the request according to user identity information associated with the credentials and at least one defined intent, the classifying resulting in a classification of the request;
  the cognitive engine further configured for determining, based on the request, to retrieve additional data, the additional data selected from the group consisting of human resources data, data regarding legal restrictions, and regulatory data;
  an orchestrator configured for gathering, based on the classification, the requested data from one or more data sources for input to the cognitive engine, the orchestrator further configured for retrieving the additional data, the orchestrator further configured to use querying tools for determining permissions associated with the user identity;
  an API layer configured for calling service functions;
  services configured for routing functions and data; and
  a learning module configured for being updated based on feedback from the user identity.

* * * * *